(12) United States Patent
MacKinlay

(10) Patent No.: US 9,598,055 B1
(45) Date of Patent: Mar. 21, 2017

(54) WINDSHIELD WIPER SYSTEM

(71) Applicant: William M. MacKinlay, Tampa, FL (US)

(72) Inventor: William M. MacKinlay, Tampa, FL (US)

(*) Notice: Subject to any disclaimer, the term of this patent is extended or adjusted under 35 U.S.C. 154(b) by 0 days.

(21) Appl. No.: 14/964,072

(22) Filed: Dec. 9, 2015

Related U.S. Application Data

(60) Provisional application No. 62/090,677, filed on Dec. 11, 2014.

(51) Int. Cl.
*B60S 1/38* (2006.01)
*B60S 1/40* (2006.01)
*B60S 1/04* (2006.01)

(52) U.S. Cl.
CPC ........... *B60S 1/4019* (2013.01); *B60S 1/0444* (2013.01); *B60S 1/3849* (2013.01); *B60S 2001/3824* (2013.01); *B60S 2001/3836* (2013.01); *B60S 2001/3837* (2013.01); *B60S 2001/4022* (2013.01)

(58) Field of Classification Search
CPC ...... B60S 1/40; B60S 1/38; B60S 2001/3824; B60S 2001/3837; B60S 1/3849; B60S 2001/3836

USPC .............................. 15/250.33, 250.41, 250.4
See application file for complete search history.

(56) References Cited

U.S. PATENT DOCUMENTS

| | | | | |
|---|---|---|---|---|
| 1,779,344 A | * | 10/1930 | Tarver | B60S 1/3427 15/250.33 |
| 1,786,457 A | * | 12/1930 | Sarver | A47L 1/06 15/245 |
| 2,025,888 A | * | 12/1935 | Olivero | B60S 1/38 15/250.33 |
| 5,392,488 A | * | 2/1995 | Li | B60S 1/3801 15/250.19 |

* cited by examiner

*Primary Examiner* — Gary Graham

(57) ABSTRACT

An elongated blade has an interior section and an exterior section. The interior section is adapted to be releasably coupled to a wiper arm. The exterior section has a W-shaped configuration with outer walls and inner walls. Two parallel edges are formed by the outer walls and the inner walls. The parallel edges are positioned in sliding contact with an exterior surface of a windshield during operation and use. A coupling assembly releasably couples the elongated blade to the wiper arm. The elongated blade is adapted to oscillate with respect to the wiper arm in response to a reversing of directions by the wiper arm and the elongated blade.

3 Claims, 3 Drawing Sheets

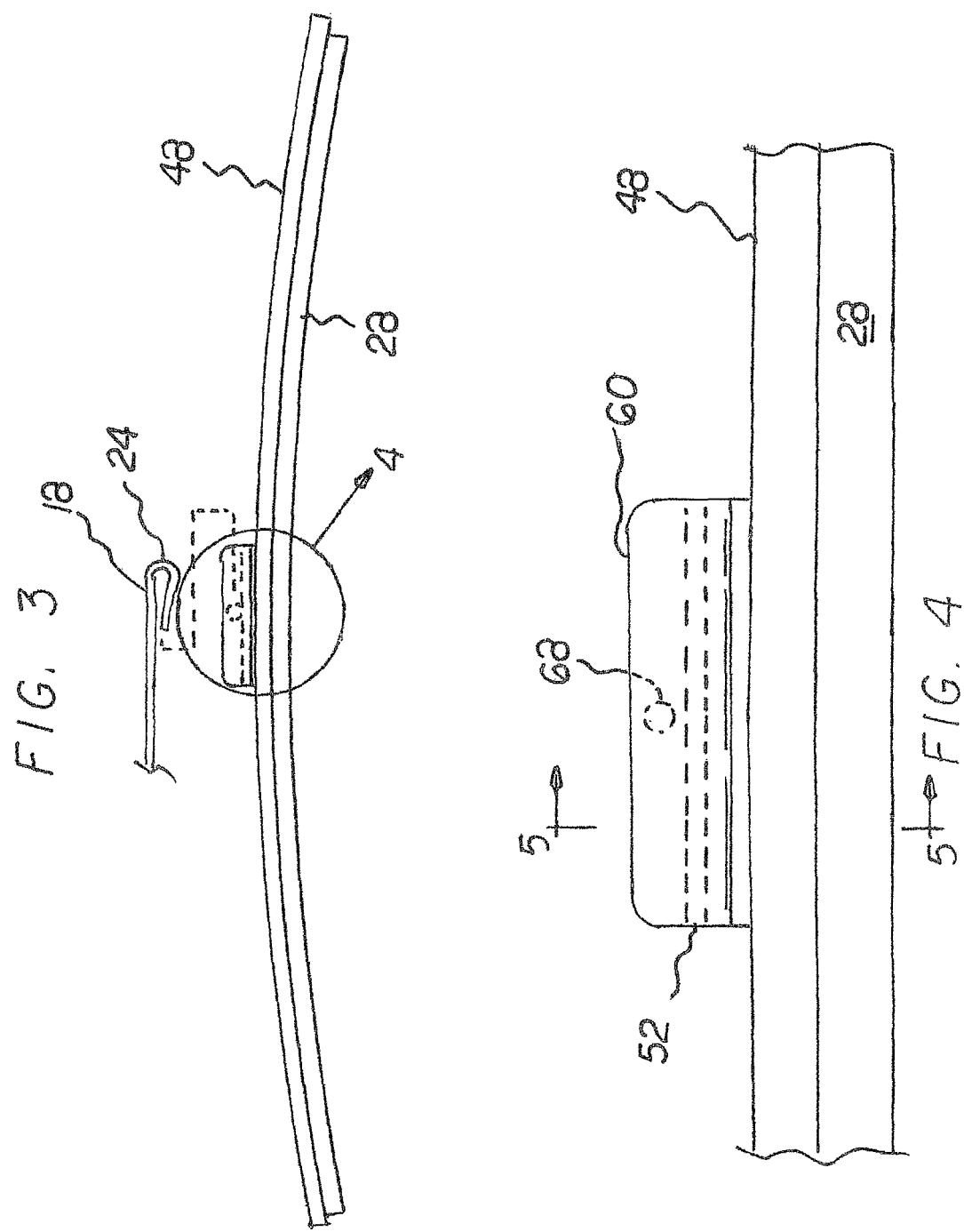

WINDSHIELD WIPER SYSTEM

RELATED APPLICATION

This non-provisional application is based upon and claims priority of Provisional Application No. 62/090,677 filed Dec. 11, 2014, the subject matter of which application is incorporated herein by reference.

BACKGROUND OF THE INVENTION

Field of the Invention

The present invention relates to a windshield wiper system and more particularly pertains to wiping rain water from a windshield and for abating blade chattering normally attendant with blade reversal, the wiping and the abating of blade chattering being done in a safe, convenient, and economical manner.

Description of the Prior Art

The use of windshield wiper systems of known designs and configurations is known in the prior art. More specifically, windshield wiper systems of known designs and configurations previously devised and utilized for the purpose of wiping rain water from windshields are known to consist basically of familiar, expected, and obvious structural configurations, notwithstanding the myriad of designs encompassed by the crowded prior art which has been developed for the fulfillment of countless objectives and requirements.

While the prior art devices fulfill their respective, particular objectives and requirements, they do not describe windshield wiper system that allows wiping rain water from a windshield and abating blade chattering normally attendant with blade reversal. The wiping and the abating of blade chattering are done in a safe, convenient, and economical manner.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

Therefore, it can be appreciated that there exists a continuing need for a new and improved windshield wiper system which can be used for wiping rain water from a windshield and for abating blade chattering normally attendant with blade reversal, the wiping and the abating of blade chattering being done in a safe, convenient, and economical manner. In this regard, the present invention substantially fulfills this need.

SUMMARY OF THE INVENTION

In view of the disadvantages inherent in the known types of wiping systems of known designs and configurations now present in the prior art, the present invention provides an improved windshield wiper system. As such, the general purpose of the present invention, which will be described subsequently in greater detail, is to provide a new and improved windshield wiper system and method which has all the advantages of the prior art and none of the disadvantages.

The present invention, the windshield wiper system 10 is comprised of a plurality of components. Such components are individually configured and correlated with respect to each other so as to attain the desired objective. In their broadest context such include an elongated blade and a coupling system. From this broad viewpoint, first provided is an elongated blade 28. The elongated blade has an interior section 30 and an exterior section 32. A wiper arm 18 is provided. The interior section is adapted to be releasably coupled to the wiper arm. The exterior section has a W-shaped configuration with outer walls 36 and inner walls 38. The wiper arm has two parallel edges 40. The parallel edges are formed by the outer walls and the inner walls. A windshield 12 is provided. The windshield has an exterior surface 14. The parallel edges are positioned in sliding contact with the exterior surface of the windshield during operation and use. A coupling assembly releasably couples the elongated blade to the wiper arm. The elongated blade is adapted to oscillate with respect to the wiper arm in response to a reversing of directions by the wiper arm and the elongated blade. Such components are individually configured and correlated with respect to each other so as to attain the desired objective.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including such equivalent constructions insofar as they do not depart from the spirit and scope of the present invention. It is therefore an object of the present invention to provide a new and improved windshield wiper system which has all of the advantages of the prior art windshield wiper systems of known designs and configurations and none of the disadvantages.

It is another object of the present invention to provide a new and improved windshield wiper system which may be easily and efficiently manufactured and marketed.

It is further object of the present invention to provide a new and improved windshield wiper system which is of durable and reliable constructions.

An even further object of the present invention is to provide a new and improved windshield wiper system which is susceptible of a low cost of manufacture with regard to both materials and labor, and which accordingly is then susceptible of low prices of sale to the consuming public, thereby making such windshield wiper system economically available to the buying public.

Lastly, it is an object of the present invention of provide a windshield wiper system for wiping rain water from a windshield and for abating blade chattering normally attendant with blade reversal, the wiping and the abating of blade chattering being done in a safe, convenient, and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a side elevational view taken along line 3-3 of FIG. 2.

FIG. 4 is an enlarged side elevational view taken at circle 4 of FIG. 3.

The same reference numerals refer to the same parts throughout the various Figures.

DESCRIPTION OF THE PREFERRED EMBODIMENT

Figure 1:
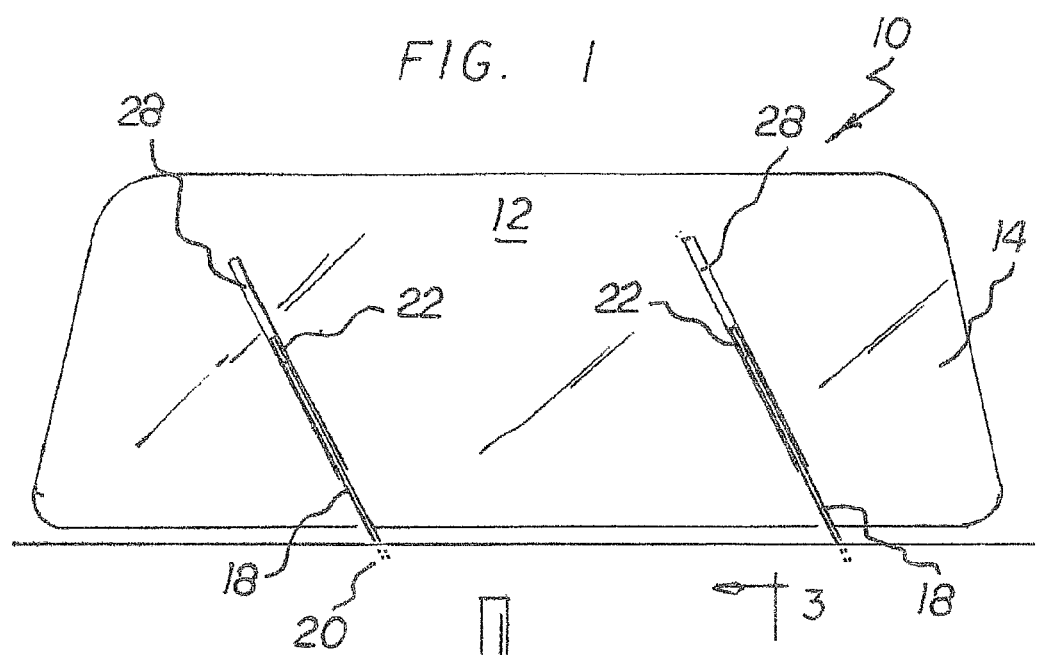
FIG. 1 is a front elevational view of a windshield wiper system constructed in accordance with the principles of the present invention.
Figure 2:
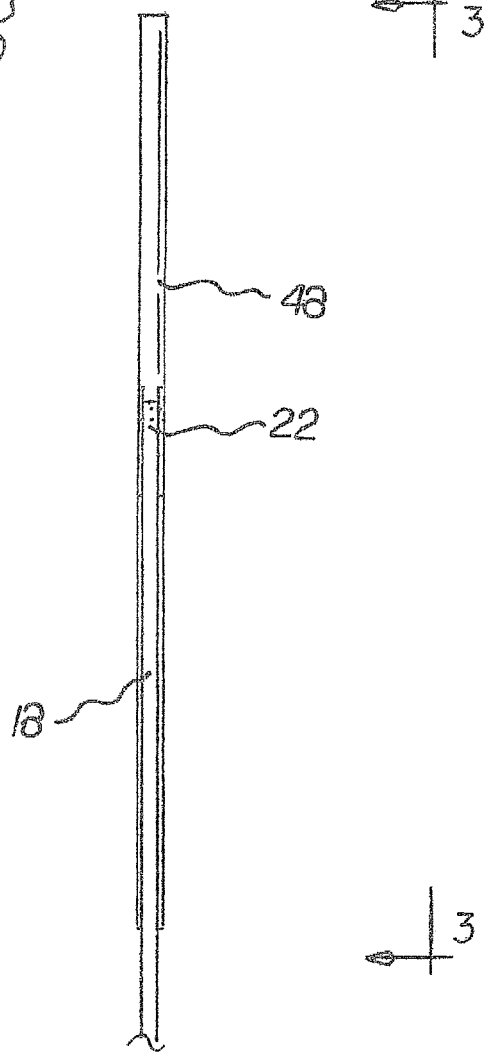
FIG. 2 is an enlarged front elevational view of a portion of the windshield wiper system illustrated in FIG. 1.
Figure 5:
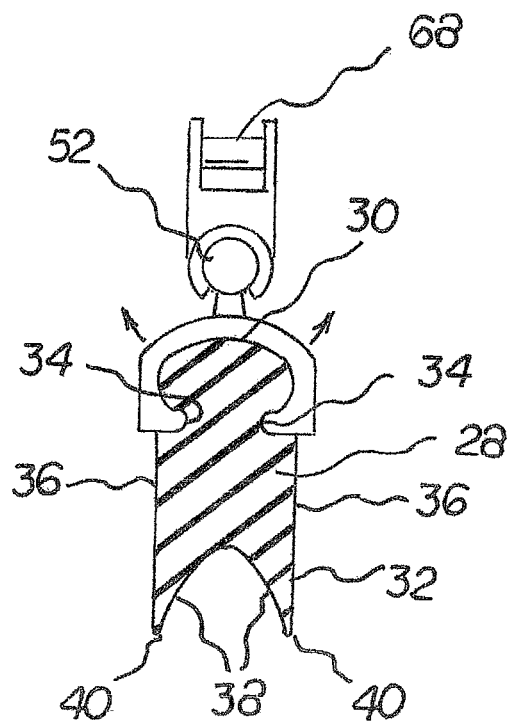
FIG. 5 is a cross sectional view taken along line 5-5 of FIG. 4.
Figures 6, 7:
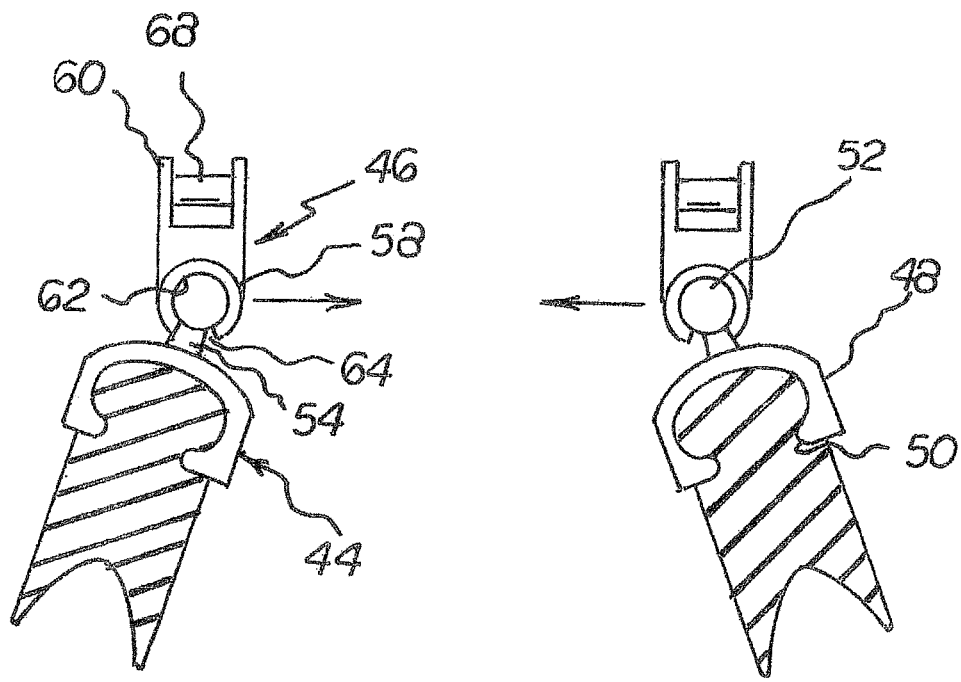
FIG. 6 is a cross sectional view similar to FIG. 5 but showing the elongated blade moving to the right.
FIG. 7 is a cross sectional view similar to FIG. 5 but showing the elongated blade moving to the left.

With reference now to the drawings, and in particular to FIG. 1 thereof, the preferred embodiment of the new and improved windshield wiper system embodying the principles and concepts of the present invention and generally designated by the reference numeral 10 will be described.

The present invention, the windshield wiper system 10 is comprised of a plurality of components. In their broadest context such include an elongated blade and a coupling system. Such components are individually configured and correlated with respect to each other so as to attain the desired objective.

From a specific viewpoint, the present invention is a windshield wiper system. First provided is a windshield 12. The windshield has an exterior surface 14. The exterior surface of the windshield is adapted to be wiped clean.

A wiper arm 18 is provided. The wiper arm has a lower end 20 and an upper end 22. The wiper arm is positioned over the exterior surface of the windshield. The lower end is pivotably coupled to a source of power for oscillating the wiper arm across the exterior surface of the windshield. The upper end has a hook 24 located above the exterior surface of the windshield.

Provided next is an elongated blade 28. The elongated blade has an interior section 30 and an exterior section 32. The interior section is generally rectilinear in configuration. The interior section has laterally facing recesses 34. The exterior section is W-shaped in a cross sectional configuration with parallel outer walls 36 and arcuate inner walls 38. The inner walls and the outer walls form two parallel edges 40. Each of the parallel edges form an angle of between 15 degrees and 25 degrees. The parallel edges are positioned in sliding contact with the exterior surface of the windshield during operation and use. The elongated blade has a length. The elongated blade is fabricated of an elastomeric material. The elastomeric material is chosen from the class of elastomeric materials consisting of plastic and rubber, natural and synthetic, and blends thereof.

Provided last is a coupling assembly. The coupling assembly releasably couples the elongated blade to the wiper arm. The coupling assembly includes a clasp 44. The coupling assembly also includes a bracket 46. The clasp has a proximal end 48. The clasp is in C-shaped cross sectional configuration. The clasp has in-turned fingers 50. The in-turned fingers are positioned in the recesses of the elongated blade. In this manner releaseable securement is provided. The proximal end of the clasp has a length. The clasp has a distal end 52. The distal end is in a cylinder-shaped cross sectional configuration. The clasp has a leg 54. The leg couples together the distal end and the proximal end of the clasp. The leg has a diameter. The leg is attached to a central extent of the proximal end of the clasp.

The bracket has a proximal end 58 and a distal end 60. The proximal end of the bracket has a generally cylindrical recess 62. The generally cylindrical recess receives the distal end of the clasp. The generally cylindrical recess has an arcuate opening 64. The arcuate opening has a width. In this manner the leg may pass through the arcuate opening. The width of the opening is from 40 percent to 60 percent greater than the diameter of the leg. In this manner oscillating the leg, the clasp, and the elongated blade with respect to the bracket for up to 25 degrees in opposite directions from a central position is facilitated. The distal end of the bracket has an axle 68. The axle removably receives the hook. In this manner the elongated blade is oscillated in response to oscillation of the wiper arm. The elongated blade is adapted to oscillate with respect to the wiper arm in response to a reversing of directions by the wiper arm and the elongated blade.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A windshield wiper system comprising:
an elongated blade having an interior section and an exterior section, the interior section having a generally rectilinear configuration with laterally facing recesses, the interior section adapted to be releasably coupled to a wiper arm, the wiper arm having an upper end with a hook, the exterior section having a W-shaped configuration with outer walls and curved inner walls, two parallel edges formed by the outer walls and the inner walls, the parallel edges positioned in sliding contact with an exterior surface of a windshield during operation and use; and a coupling assembly releasably coupling the elongated blade to the wiper arm, the elongated blade adapted to oscillate with respect to the wiper arm in response to a reversing of directions by the wiper arm and the elongated blade;

the coupling assembly having a clasp (44) and a bracket (46), the clasp having a proximal end (48) in a C-shaped cross sectional configuration with in-turned fingers (50) positioned in the recesses of the elongated blade for releaseable securement purposes, the proximal end of the clasp having a longitudinal length, the clasp having a distal end (52) in a cylinder-shaped cross sectional configuration, a leg (54) coupling together the distal end and the proximal end of the clasp, the leg having a diameter, the leg being attached to a central extent of the proximal end of the clasp, the distal end of the clasp having a longitudinal length shorter than the longitudinal length of the proximal end of the clasp;

the bracket (46) having a proximal end (58) and a distal end (60), the proximal end of the bracket being formed with a generally cylindrical recess (62) receiving the distal end of the clasp, the generally cylindrical recess having an arcuate opening (64) with a width for the passage of the leg, the width of the opening being from 40 percent to 60 percent greater than the diameter of the leg to facilitate oscillating the leg and the clasp and the elongated blade with respect to the bracket for up to 25 degrees in opposite directions from a central position, the distal end of the bracket formed with an axle (68) removably receiving the hook to oscillate the elongated blade in response to oscillation of the wiper arm, the elongated blade adapted to oscillate with respect to the wiper arm in response to a reversing of directions by the wiper arm and the elongated blade.

2. The system as set forth in claim 1 wherein the outer walls (36) of the elongated blade are parallel with each other and the inner walls (38) are arcuate.

3. A windshield wiper system (10) for wiping rain water from a windshield (12) and for abating blade chattering normally attendant with blade reversal, the wiping and the abating of blade chattering being done in a safe, convenient, and economical manner, the system comprising, in combination:

the windshield (12) having an exterior surface (14) adapted to be wiped clean;

a wiper arm (18) having a lower end (20) and an upper end (22), the wiper arm being positioned over the exterior surface of the windshield, the lower end pivotably coupled to a source of power for oscillating the wiper arm across the exterior surface of the windshield, the upper end having a hook (24) located above the exterior surface of the windshield;

an elongated blade (28) having an interior section (30) and an exterior section (32), the interior section having a generally rectilinear configuration with laterally facing recesses (34), the exterior section having a W-shaped cross sectional configuration with parallel outer walls (36) and with arcuate inner walls (38), the inner walls and the outer walls forming two parallel edges (40), each of the parallel edges forming an angle of from 15 degrees and 25 degrees, the parallel edges positioned in sliding contact with the exterior surface of the windshield during operation and use, the elongated blade having a length, the elongated blade being fabricated of an elastomeric material chosen from the class of elastomeric materials consisting of plastic and rubber, natural and synthetic, and blends thereof; and a coupling assembly releasably coupling the elongated blade to the wiper arm, the coupling assembly having a clasp (44) and a bracket (46), the clasp having a proximal end (48) in a C-shaped cross sectional configuration with in-turned fingers (50) positioned in the recesses of the elongated blade for releaseable securement purposes, the proximal end of the clasp having a length, the clasp having a distal end (52) in a cylinder-shaped cross sectional configuration, a leg (54) coupling together the distal end and the proximal end of the clasp, the leg having a diameter, the leg being attached to a central extent of the proximal end of the clasp;

the bracket (46) having a proximal end (58) and a distal end (60), the proximal end of the bracket being formed with a generally cylindrical recess (62) receiving the distal end of the clasp, the generally cylindrical recess having an arcuate opening (64) with a width for the passage of the leg, the width of the opening being from 40 percent to 60 percent greater than the diameter of the leg to facilitate oscillating the leg and the clasp and the elongated blade with respect to the bracket for up to 25 degrees in opposite directions from a central position, the distal end of the bracket formed with an axle (68) removably receiving the hook to oscillate the elongated blade in response to oscillation of the wiper arm, the elongated blade adapted to oscillate with respect to the wiper arm in response to a reversing of directions by the wiper arm and the elongated blade.

\* \* \* \* \*